United States Patent
Mei et al.

(10) Patent No.: US 9,519,837 B2
(45) Date of Patent: Dec. 13, 2016

(54) TRACKING USING MULTILEVEL REPRESENTATIONS

(71) Applicants: Toyota Motor Engineering & Manufacturing North America, Inc., Erlanger, KY (US); University of Technology, Sydney, Ultimo (AU)

(72) Inventors: Xue Mei, Ann Arbor, MI (US); Chaohui Wang, Tubingen (DE); Zhibin Hong, Sydney (AU); Danil V. Prokhorov, Canton, MI (US); Dacheng Tao, Ultimo (AU)

(73) Assignees: Toyota Motor Engineering & Manufacturing North America, Inc., Erlanger, KY (US); University of Technology, Sydney, Ultimo (AU)

( * ) Notice: Subject to any disclaimer, the term of this patent is extended or adjusted under 35 U.S.C. 154(b) by 221 days.

(21) Appl. No.: 14/323,360

(22) Filed: Jul. 3, 2014

(65) Prior Publication Data

US 2016/0004909 A1    Jan. 7, 2016

(51) Int. Cl.
  *G06K 9/00* (2006.01)
  *G06K 9/32* (2006.01)
  *G06T 7/20* (2006.01)

(52) U.S. Cl.
  CPC ........... *G06K 9/3241* (2013.01); *G06T 7/2073* (2013.01); *G06K 2009/3291* (2013.01)

(58) Field of Classification Search
  USPC ......................................................... 382/103
  See application file for complete search history.

(56) References Cited

U.S. PATENT DOCUMENTS

| | | | |
|---|---|---|---|
| 2008/0232643 A1* | 9/2008 | Leichter | G06T 7/208 382/103 |
| 2008/0240497 A1* | 10/2008 | Porikli | G06T 7/20 382/103 |
| 2010/0027892 A1* | 2/2010 | Guan | G06K 9/00355 382/203 |

(Continued)

OTHER PUBLICATIONS

Achanta, R., Shaji, A., Smith, K., Lucchi, A., Fua, P., Susstrunk, S.: SLIC superpixels compared to state-of-the-art superpixel methods. TPAMI 34(11) (2012) 2274-2282.

(Continued)

*Primary Examiner* — Yon Couso
(74) *Attorney, Agent, or Firm* — Christopher G. Darrow; Darrow Mustafa PC (57) ABSTRACT

A method of tracking a target object in frames of video data includes receiving a first tracking position associated with the target object in a first frame of a video sequence; identifying, for a second frame of the video sequence, a plurality of representation levels and at least one node for each representation level; determining, by a processor, a second tracking position in the second frame by estimating motion of the target object in the second frame between the first frame and the second frame; determining, at each representation level by the processor, a value for each node based on a conditional property of the node in the second frame; and adjusting, by the processor, the second tracking position based on the values determined for each of the nodes and interactions between at least some of the nodes at different representation levels.

20 Claims, 5 Drawing Sheets

(56) References Cited

U.S. PATENT DOCUMENTS

2011/0200230 A1* 8/2011 Luke .................. G06K 9/00791
382/103

OTHER PUBLICATIONS

Adam, A., Rivlin, E., Shimshoni, I.: Robust fragments-based tracking using the integral histogram. In: CVPR. (2006) 798-805.
Aeschliman, C., Park, J., Kak, A.C.: A probabilistic framework for joint segmentation and tracking. In: CVPR. (2010) 1371-1378.
Avidan, S.: Ensemble tracking. TPAMI 29(2) (2007) 261-271.
Babenko, B., Yang, M., Belongie, S.: Robust object tracking with online multiple instance learning. TPAMI 33(8) (2011) 1619-1632.
Bosch, A., Zisserman, A., Muoz, X.: Image classification using random forests and ferns. In: ICCV. (2007) 1-8.
Boykov, Y., Funka-Lea, G.: Graph cuts and efficient nd image segmentation. IJCV 70(2) (2006) 109-131.
Boykov, Y., Kolmogorov, V.: An Experimental comparison of min-cut/max-flow algorithms for energy minimization in vision. TPAMI 26(9) (2004) 1124-1137.
Breiman, L.: Random forests. Machine learning 45(1) (2001) 5-32.
Brunelli, R.: Template matching techniques in computer vision: theory and practice. John Wiley & Sons (2009).
Chockalingam, P., Pradeep, N., Birchfield, S.: Adaptive fragments-based tracking of non-rigid objects using level sets. In: ICCV. (2009) 1530-1537.
Collins, R., Liu, Y., Leordeanu, M.: Online selection of discriminative tracking features. TPAMI 27(10) (2005) 1631-1643.
Dinh, T.B., Vo, N., Medioni, G.: Context tracker: Exploring supporters and distracters in unconstrained environments. In: CVPR. (2011) 1177-1184.
Duffner, S., Garcia, C.: Pixeltrack: a fast adaptive algorithm for tracking non-rigid objects. In: ICCV. (2013) 2480-2487.
Godec, M., Roth, P.M., Bischof, H.: Hough-based tracking of non-rigid objects. In: ICCV. (2011) 81-88.
Grabner, H., Bischof, H.: On-line boosting and vision. In: CVPR. (2006) 260-267.
Hare, S., Safari, A., Torr, P.H.: Struck: Structured output tracking with kernels. In: ICCV. (2011) 263-270.
He, X., Zemel, R.S., Carreira-Perpinan, M.A.: Multiscale conditional random fields for image labeling. In: CVPR. (2004) 695-702.
Henriques, J.F., Caseiro, R., Martins, P., Batista, J.: Exploiting the circulant structure of tracking-by-detection with kernels. In: ECCV. (2012) 702-715.
Hong, Z., Mei, X., Prokhorov, D., Tao, D.: Tracking via robust multi-task multiview joint sparse representation. In: ICCV. (2013).
Huang, Q., Han, M., Wu, B., Ioffe, S.: A hierarchical conditional random field model for labeling and segmenting images of street scenes. In: CVPR. (2011) 1953-1960.
Jia, X., Lu, H., Yang, M.H.: Visual tracking via adaptive structural local sparse appearance model. In: CVPR. (2012) 1822-1829.
Kalal, Z., Mikolajczyk, K., Matas, J.: Tracking-learning-detection. TPAMI 34(7) (2012) 1409-1422.
Kalal, Z., Mikolajczyk, K., Matas, J.: Forward-backward error: Automatic detection of tracking failures. In: ICPR. (2010) 2756-2759.
Kohli, P., Torr, P.H.: Dynamic graph cuts for ecient inference in markov random fields. TPAMI 29(12) (2007) 2079-2088.
Kwon, J., Lee, K.M.: Tracking of a non-rigid object via patch-based dynamic appearance modeling and adaptive basin hopping monte carlo sampling. In: CVPR. (2009) 1208-1215.
Kwon, J., Lee, K.M.: Visual tracking decomposition. In: CVPR. (2010) 1269-1276.
Kwon, J., Lee, K.M.: Tracking by sampling trackers. In: ICCV. (2011) 1195-1202.
Ladicky, L., Russell, C., Kohli, P., Torr, P.H.: Associative hierarchical crfs for object class image segmentation. In: ICCV. (2009) 739-746.
Lagarias, J.C., Reeds, J.A., Wright, M.H., Wright, P.E.: Convergence properties of the nelder-mead simplex method in low dimensions. SIAM Journal on Optimization 9(1) (1998) 112-147.
Learned-Miller, E., Sevilla-Lara, L.: Distribution fields for tracking. In: CVPR. (2012) 1910-1917.
Lepetit, V., Fua, P.: Keypoint recognition using randomized trees. TPAMI 28(9) (2006) 1465-1479.
Leung, T., Malik, J.: Representing and recognizing the visual appearance of materials using three-dimensional textons. IJCV 43(1) (2001) 29-44.
Levinshtein, A., Sminchisescu, C., Dickinson, S.: Optimal contour closure by superpixel grouping. In: ECCV, Springer (2010) 480-493.
Li, H., Shen, C., Shi, Q.: Real-time visual tracking using compressive sensing. In: CVPR. (2011) 1305-1312.
Li, X., Hu, W., Shen, C., Zhang, Z., Dick, A., Hengel, A.V.D.: A survey of appearance models in visual object tracking. ACM Transactions on Intelligent Systems and Technology (TIST) 4(4) (2013).
Liu, B., Huang, J., Yang, L., Kulikowsk, C.: Robust tracking using local sparse appearance model and k-selection. In: CVPR. (2011) 1313-1320.
Mei, X., Ling, H.: Robust visual tracking and vehicle classification via sparse representation. TPAMI 33(11) (2011) 2259-2272.
Ojala, T., Pietikainen, M., Maenpaa, T.: Multiresolution gray-scale and rotation invariant texture classification with local binary patterns. TPAMI 24(7) (2002) 971-987.
Oron, S., Bar-Hillel, A., Levi, D., Avidan, S.: Locally orderless tracking. In: CVPR. (2012) 1940-1947.
Perez, P., Hue, C., Vermaak, J., Gangnet, M.: Color-based probabilistic tracking. In: ECCV. (2002) 661-675.
Ross, D., Lim, J., Lin, R., Yang, M.: Incremental learning for robust visual tracking. IJCV 77(1) (2008) 125-141.
Rother, C., Kolmogorov, V., Blake, A.: Grabcut: Interactive foreground extraction using iterated graph cuts. ACM Transactions on Graphics (TOG) 23(3) (2004) 309-314.
Saffari, A., Leistner, C., Santner, J., Godec, M., Bischof, H.: On-line random forests. In: ICCV Workshops. (2009) 1393-1400.
Santner, J., Leistner, C., Saffari, A., Pock, T., Bischof, H.: Prost: Parallel robust online simple tracking. In: CVPR. (2010) 723-730.
Wang, S., Lu, H., Yang, F., Yang, M.H.: Superpixel tracking. In: ICCV. (2011) 1323-1330.
Wojek, C., Schiele, B.: A dynamic conditional random field model for joint labeling of object and scene classes. In: ECCV. (2008) 733-747.
Wu, Y., Lim, J., Yang, M.H.: Online object tracking: A benchmark. In: CVPR. (2013) 2411-2418.
Yang, H., Shao, L., Zheng, F., Wang, L., Song, Z.: Recent advances and trends in visual tracking: A review. Neurocomputing 74(18) (2011) 3823-3831.
Zhong, W., Lu, H., Yang, M.H.: Robust object tracking via sparsity-based collaborative model. In: CVPR. (2012) 1838-1845.
Ladicky, L., Russell, C., Kohli, P., Torr, P.: Associative Hierarchical Random Fields, Undated, in 25 pages.
Shu, G., Dehghan, A., Shah, M.: Improving an Object Detector and Extracting Regions using Superpixels, Undated, in 7 pages.
Wang, W., Nevatia, R.: Robust Object Tracking Using Constellation Model with Superpixel, Undated, in 14 pages.

\* cited by examiner

TRACKING USING MULTILEVEL REPRESENTATIONS

BACKGROUND

Object tracking has long been a classic topic in computer vision. Object tracking can be used in many practical applications, such as video surveillance and autonomous driving. Recent progress has been made in the visual object tracking research community. For example, standard benchmark datasets and quantitative evaluation metrics have been developed. Pixels can be used to explore low level cues for object tracking. Higher level image information such as bounding boxes or superpixels can also be used.

SUMMARY

Implementations of systems, methods, and apparatus for tracking an object in a video sequence using multilevel representations are disclosed herein.

One aspect of the disclosed implementations is a method for tracking a target object in frames of video data. The method includes receiving a first tracking position, such as a bounding box associated with a target object, in a first frame of a video sequence. Multiple representation levels and at least one node for each representation level can be identified for a subsequent frame (referred to as a second frame) of the video sequence. The representation levels can include pixel level, superpixel level, or bounding box level of representation. Correspondingly, the nodes can be associated with a pixel, a superpixel, or a bounding box. The nodes and the representation levels can be determined using a Conditional Random Field model. The tracking position of the target object (referred to as the second tracking position) in the second frame can be determined by estimating motion of the target object between the first frame and the second frame. Depending on the representation level, the value for each node can be determined based on a conditional property (such as a probability value) of the node (such as labelling of the pixel or superpixel). The estimated second tracking position (such as pose of the bounding box) can also be used. The second tracking position can be adjusted based on the node values and interactions between the nodes at different representation levels. The interactions can be used to determine pairwise energy potential values for two nodes from different representation levels in the Conditional Random Field model.

Another aspect of the disclosed implementations is an apparatus for tracking a target object in frames of video data. The apparatus can include one or more processors and a memory. The memory stores data and program instructions that can be executed by the processors. The processors are configured to execute instructions stored in the memory. The instructions can include instructions to receive a first tracking position, such as a bounding box associated with the target object, in a first frame of a video sequence. The instructions can also include instructions to identify multiple representation levels and at least one node for each representation level in a second frame of the video sequence. The nodes and the representation levels can be determined using a Conditional Random Field model. The instructions can also include instructions to determine the second tracking position of the target object in the second frame based on the first tracking position by estimating motion of the target object between the first frame and the second frame. Depending on the representation level, the value for each node can be determined based on a conditional property (such as a probability value) of the node (such as labelling of the pixel or superpixel). The estimated second tracking position (such as pose of the bounding box) can also be used. The instructions can also include instructions to adjust the second tracking position based on the node values and interactions between the nodes at different representation levels. The interactions can be used to determine pairwise energy potential values for two nodes from different representation levels in the Conditional Random Field model.

Variations in these and other aspects will be described in additional detail hereafter.

BRIEF DESCRIPTION OF THE DRAWINGS

The description here makes reference to the accompanying drawings wherein like reference numerals refer to like parts throughout the several views, and where:

FIG. 2a is an example tracking result for a frame in the video sequence of FIG. 2;

FIG. 2b is an example set of superpixels for the frame of FIG. 2a;

FIGS. 2c-2f are example outputs of pixel and superpixel level tracking results of FIG. 2a;

DETAILED DESCRIPTION

Object tracking is used in many practical applications, such as video surveillance and autonomous driving. Given the position of a target in one frame, a tracker should be able to track the target in subsequent frames and overcome various challenges, such as appearance variations, occlusions and illumination changes. Terms such as "frame", "image", and "image frame" are used interchangeably herein.

In some instances, a certain representation level of an image space is used for object tracking. The representation level (sometimes also referred to as the quantization level) can include any information related to representation, quantization, resolution, granularity, hierarchy or segmentation of an image, or any other manner of subdividing an image for object tracking.

For example, a representation level can include pixel level, superpixel level, or bounding box level representations. For example, at the pixel level, the image space can be examined for low level cues that can be used for tracking. Mid level visual cues, such as those found at the superpixel level, can provide more information about the local structure of images, while still retaining the flexibility to model non-rigid deformation. Superpixels can be used to cluster pixels in a frame using various clustering techniques. In addition, trackers can be built to exploit high level visual information using learning models such as holistic appearance models or Random Forests (RFs). Such high level visual information can include, for example, bounding box information. A common optimal representation level that is suitable for tracking all objects in all environments, however, is often not feasible.

In some video sequences, a target can change its size rapidly, and the background can become very cluttered. As will be described in detail below, multilevel appearance representation incorporated in a graphical model can significantly improve the performance over tracking methods based on single level representations.

Figure 1:
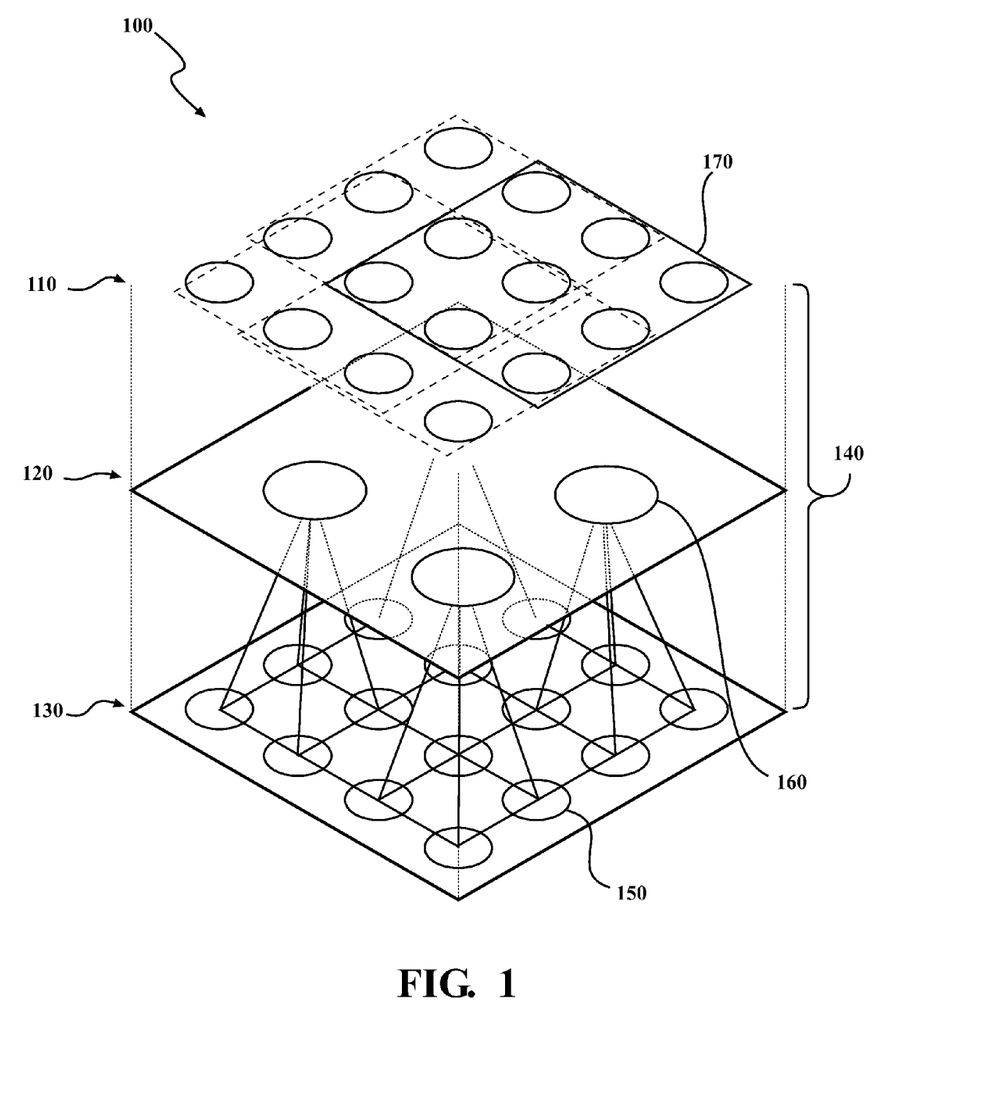
FIG. 1 is a schematic of an example video object tracking model according to implementations of this disclosure.

In implementations of this disclosure, multilevel representations, such as a hierarchical appearance representation model shown in FIG. 1, can be used for tracking. The multilevel representations can include, for example, information derived from different representation levels, such as the pixel level, the superpixel level, or the frame level (e.g., by using a bounding box). The model can be based on a graphical model that exploits information across multiple representation levels. By exploiting multiple representation levels, the information contained at each representation level can be utilized and integrated by modeling the interactions and constraints between different representation levels. The interactions and constraints can be used to optimize the tracking result.

For example, different levels of representations can be incorporated into a probabilistic model such as a Conditional Random Field (CRF) model using a coherent framework. The information derived from multiple representation levels can be unified in the coherent CRF framework. The object tracking can be generated based on the CRF, which unifies multiple representations of the image space.

In addition to using multilevel representation for object tracking, implementations of this disclosure also address appearance variations of an object by exploiting color-texture features, or applying learning techniques such as Online Random Forests (ORFs). For example, ORFs can be used to update the appearance model in different levels of the tracker, so that changes in object appearance can be captured over time. These ORFs can be strategically updated in the framework to capture appearance changes due to deformation or illumination over time.

These and other examples are now described with reference to the accompanying drawings.

FIG. 1 is a schematic of a video object tracking model 100 in which aspects of the disclosure can be implemented. In FIG. 1, an example structure of a hierarchical multilevel representation model 140 of a video object tracking system (such as object tracking system 300 in FIG. 3) is shown.

In the example of FIG. 1, three representation levels are shown from coarse to fine: bounding box level 110, superpixel level 120, and pixel level 130. Other representation levels can also be used. For example, pixel level 130 can be replaced by any other low level representation, such as subpixel level. Superpixel level 120 can also be replaced by any other middle level representation, such as segmentation level or block level. Bounding box level 110 can replaced by any object information at the frame level (also referred to as high level). Even though the illustrated example has three levels, in other implementations, a different number of levels or a non-hierarchical representation model can be used for implementing the object tracking system 300.

The multilevel representation model 140 can use, for example, a probability model such as CRF models to model tracking information as nodes. For example, a node (e.g., pixel node 150 in FIG. 1) can be used to model a pixel. Similarly, a node such as a superpixel node 160 can be used to model a superpixel. A node such as a bounding box node 170 can be used to model a bounding box at the frame level.

At the pixel level 130, each pixel receives a measurement value. The measurement value can include a probability output using learning techniques such as a Random Forest (RF). For example, learning techniques such as an ORF equipped with color-texture features can be used to provide a soft (or temporary) label to each pixel, which indicates the probability that the pixel belongs to the target. In addition, a pixel node can connect to the corresponding superpixel node (such as the node of the superpixel that contains that pixel) and an interaction between the two can be evaluated, as will be described in detail below.

At the superpixel level 120, superpixels can be generated by considering various cues (e.g., the spatial relationship and/or feature similarity between pixels), which suggests a consistent pixel labeling within each superpixel. Each superpixel node can also obtain a probability output by another RF to suggest the pixels within the same superpixel to share the same label. In some implementations, another ORF, which can be based on normalized histogram features of superpixels, can also be trained for the superpixel level representation.

At the bounding box level 110, different candidate bounding boxes (such as dotted lines that form various candidate bounding boxes as illustrated in FIG. 1) can be considered. The optimal bounding box (such as the solid lines that form bounding box 170) having the optimal configuration can be selected from the candidate bounding boxes using the multilevel representation techniques discussed below. For example, a bounding box level regularization term can be introduced, which can selectively incorporate other information of a given bounding box, such as shape and motion, or the measurement given by other trackers.

Figure 2:
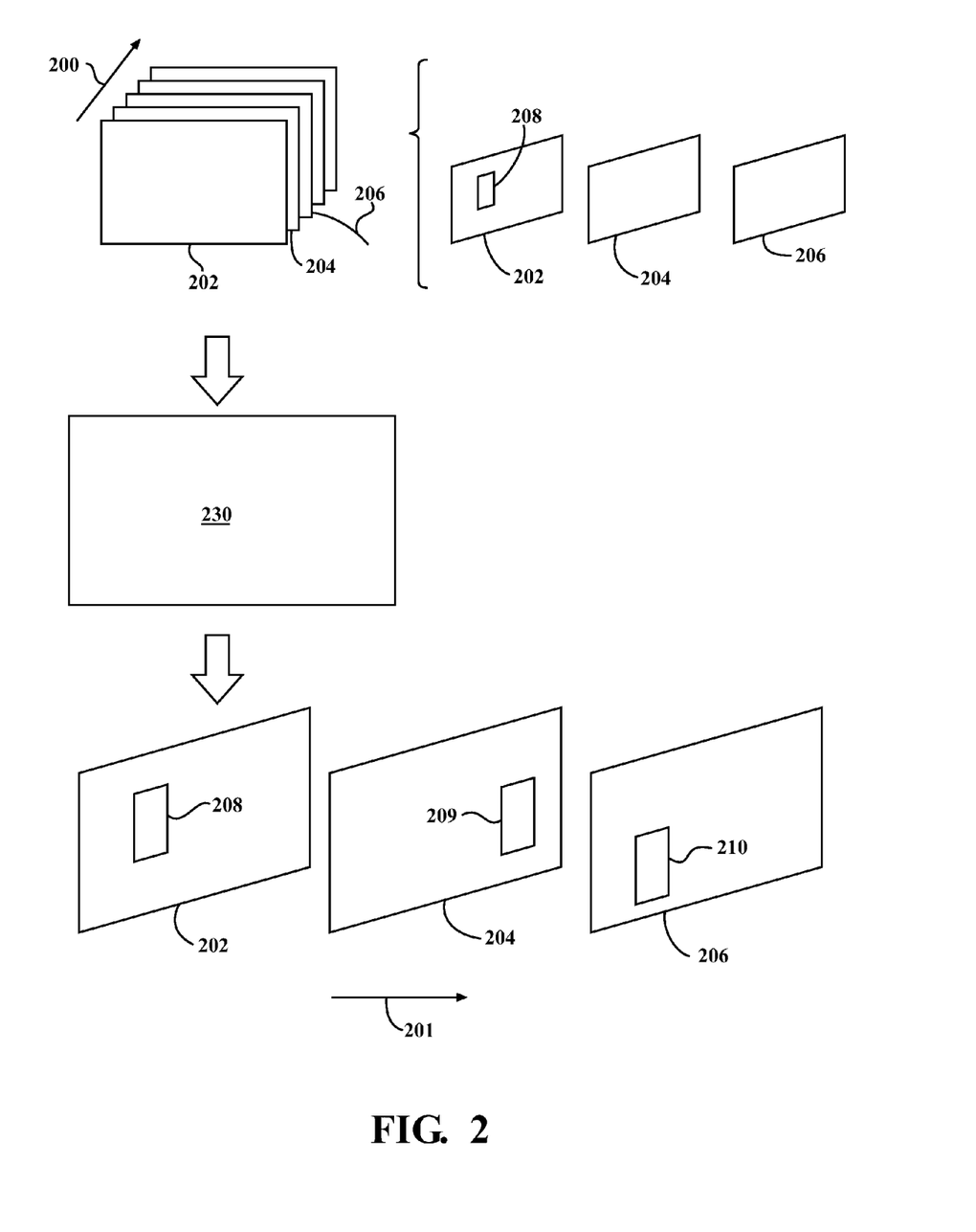
FIG. 2 is a diagram of an example video stream (or sequence) and an example video object tracker using multilevel representations.

FIG. 2 is a diagram of an example video stream (or sequence) and an example video object tracker using multilevel representations. Video stream (also referred to herein as video data) includes a video sequence 200. In this example, video sequence 200 is a video sequence of a game of Basketball. At the next level, video sequence 200 includes a number of adjacent frames such as frames 202, 204, 206. While only three frames are enumerated in FIG. 2, video sequence 200 can include any number of adjacent frames. Each frame such as frame 202, 204, or 206 can capture a scene with one or more objects, such as people, vehicles, background elements, graphics, text, a blank wall, or any other information. The video sequence 200 can be encoded or compressed using, for example, a video compression standard or any other video compression technique. The compressed video sequence 200 can be stored, transmitted, received, decoded or decompressed using any video compression technique.

As shown in FIG. 2, a tracker 230 in a video object tracking system (such as object tracking system 300 in FIG. 3) receives input such as video sequence 200 and an initial bounding box 208. The initial bounding box 208 can be a bounding box for a target object in the first frame of the video sequence 200, such as frame 202 in the example of FIG. 2. The initial bounding box 208 can be predefined, given, or determined using any technique for calculating a bounding box in a frame.

Tracker 230 uses multilevel representation techniques to determine a bounding box for each subsequent frame. Output of tracker 230 can include, for example, bounding box 209 determined for frame 204, and bounding box 210 determined for frame 206, and so on. Tracker 230 can use the model in FIG. 1, or any other multilevel representation model, to determine the bounding boxes for tracking the target object. Using a learning technique, such as RF, tracker 230 can determine a soft or temporary label for each pixel (or superpixel) to indicate the probability that the pixel belongs to the target. The soft or temporary label can be used to generate a final labelling result. The labelling results can be used to generate the output bounding box, as will be discussed below in Equations 1-8. A tracker can be trained to find an optimal position of a target object by, for example, jointly classifying the pixels and superpixels and obtaining an optimal configuration across all levels. In determining the optimal position, the motion of the bounding box can be also taken into consideration.

In some instances, multilevel data fusion can be used for image segmentation and labeling using random field techniques such as CRF or Markov Random Fields. In addition, learning techniques such as ORFs can be used to provide pixel and superpixel level representation, while progressively updating the posterior probability on the fly. Multilevel representation using graphical models, such as the hierarchical representation model 140 illustrated in FIG. 1, can bridge the different levels of representations by fusing multilevel representation information. These techniques can permit efficient optimization of the tracking result using optimization techniques such as dynamic graph cuts, as will be further discussed below.

Figures 2A, 2B:
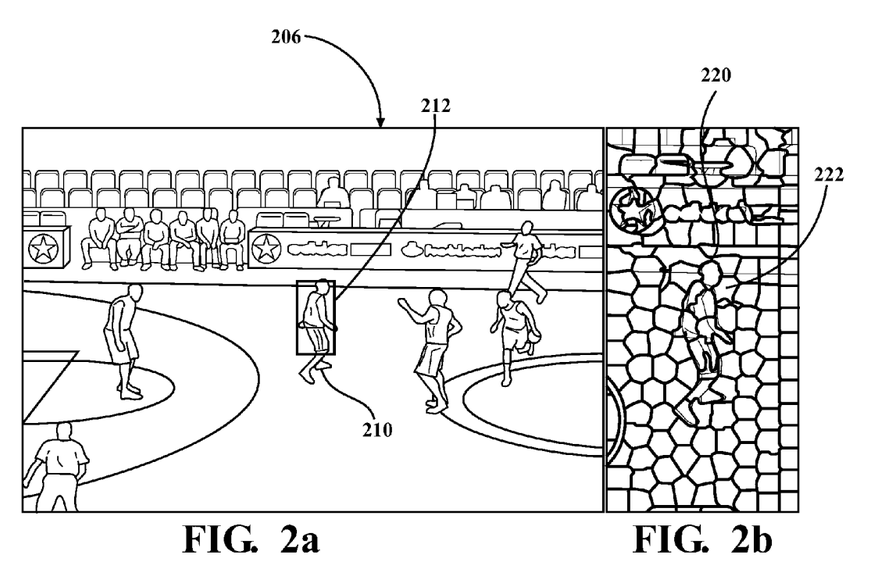

FIG. 2a shows an example tracking result by tracker 230 for frame 206 in the basketball sequence 200. The tracking result is shown by the bounding box 212, which tracks a player object 210. FIG. 2b shows an example superpixelization of an image from the frame 206. Superpixels can be used to cluster pixels in a frame. For example, superpixel 220 is a superpixel that represents the head portion of the player object 210. Superpixel 222 is a superpixel that represents the background.

Figure 2C:
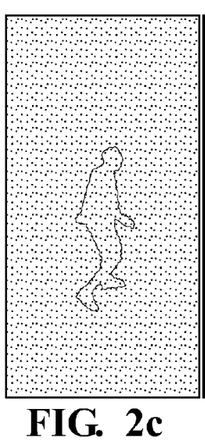
Figure 2D:
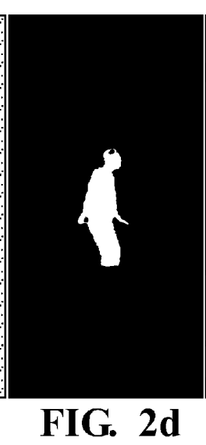
Figure 2E:
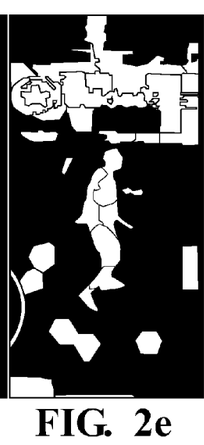
Figure 2F:
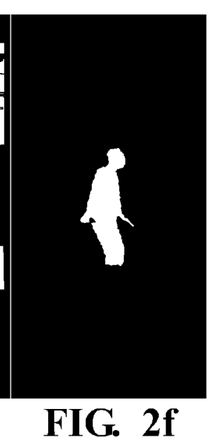

As discussed above and will be described in detail below, the tracking result for each frame can be generated using multilevel representations, such as the example hierarchical representation model 140 introduced in FIG. 1. FIG. 2c and FIG. 2d show an example output of the pixel level RF result (e.g., the soft or temporary label applied to a pixel) and corresponding final labeling result, respectively. Similarly, FIG. 2e and FIG. 2f show an example output of the superpixel level RF result and corresponding final labeling result, respectively.

Figure 3:
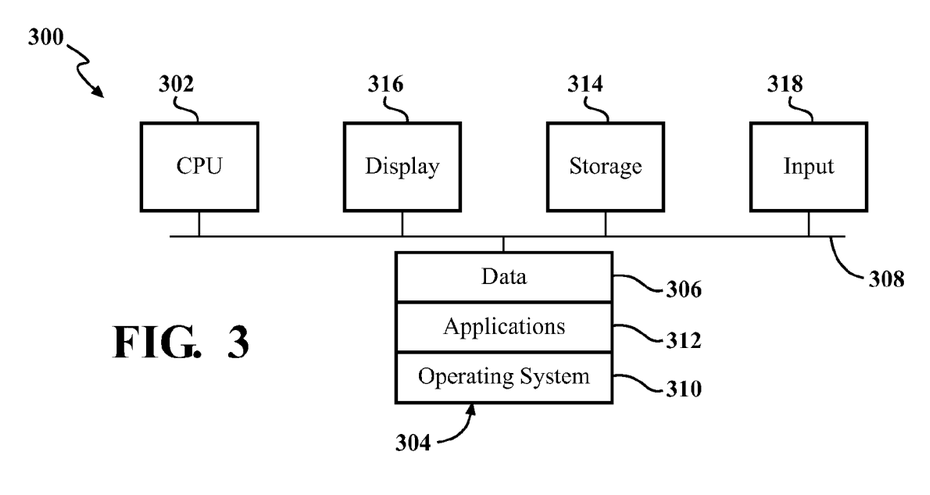
FIG. 3 is a block diagram of an example object tracking system according to implementations of this disclosure.
Figure 4:
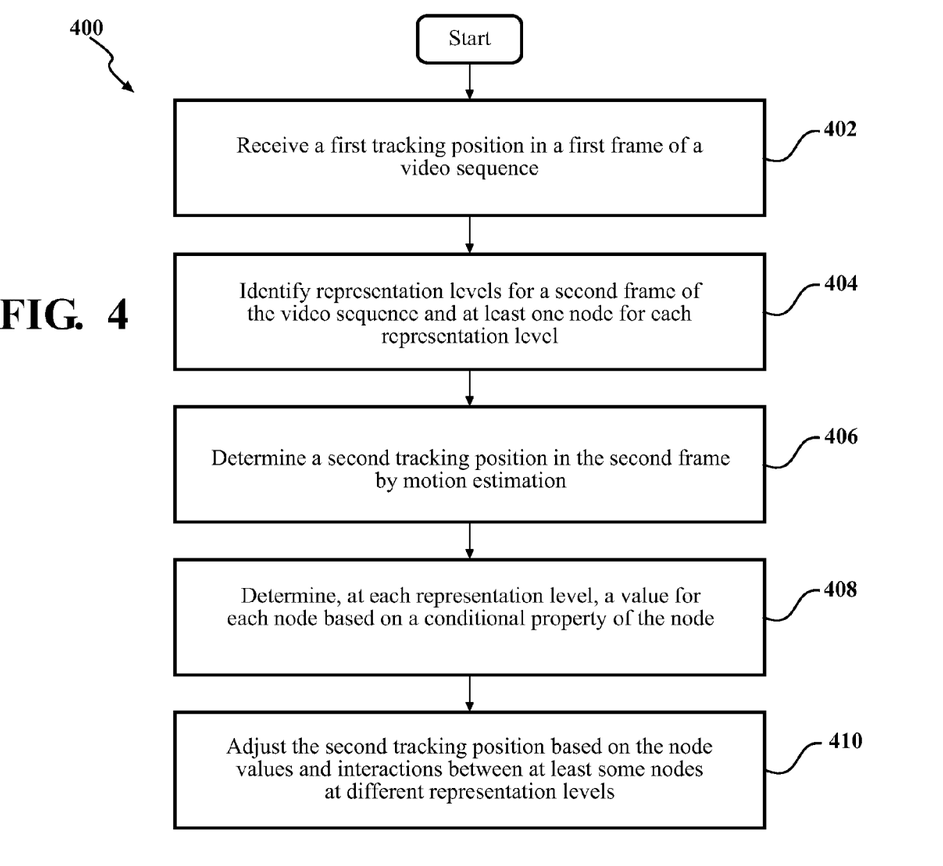
FIG. 4 is a flow diagram of an example process performed by the object tracking system of FIG. 3.

FIG. 3 is an example diagram of an object tracking system 300 and FIG. 4 is a flow diagram of an example process 400 performed by the object tracking system 300 according to implementations of this disclosure. Object tracking can be implemented with multilevel representations as described in detail below.

Tracking with Multilevel Representations.

In some implementations, the tracker combines multilevel representations as a single graphical model to produce an efficient and robust solution to online object tracking. The tracker may also include other components, such as feature extraction, online color-texture forests, model training, occlusion handling, or any other additional feature. For example, scale change of the object or texture information can be included to enhance the tracking results.

Multilevel representations can include extracting information from multiple hierarchical appearance representation levels. In the examples where three levels are used (such as the example in FIG. 1), the three hierarchical appearance representation levels can include representations at the pixel level, superpixel level and bounding box level respectively. In other examples, other information can be used for the representation levels such as scale change or segmentation information. The number of levels is also not limited to three, and can include two levels, four or more levels, or in some implementations, can be adaptively changed from frame to frame.

RFs can be used to provide pixel or superpixel level representations. RFs include a set of randomized decision trees. In each decision tree, an internal node can correspond to or be associated with a random test on an input feature. The internal node can be used to determine which child node the feature should be assigned to. Therefore, a feature vector is presented to the root of a tree and it follows a specific path to a leaf node, which stores a histogram obtained during the training phase. The histogram can include occurrence frequency of each class. Given a test sample f, the probability can be estimated by averaging the probabilities of all the trees:

$$p(\text{class} = c \mid f) = \frac{1}{N}\sum_{n=1}^{N} p_n(\text{class} = c \mid f)$$

where N denotes the number of the trees, and $p_n(\text{class}=c|f)$ is the probability that the feature belongs to class c output by the tree n.

Pixels are often the finest representation level in a frame. Let P denote the set of pixels and each pixel $i \in P$ be represented by a d-dimensional feature vector $f_i \in R^d$ that is associated with a unique binary label $x_i \in \{0 \text{ (background)}, 1 \text{ (foreground or object)}\}$ and includes some local information. The pixel level unary energy function can be defined as:

$$\varphi_i^p(x_i) = -\log p(x_i; H^p) \quad \text{(Equation 1)}$$

where $p(x_i; H^p)$ denotes the probability that pixel i is labeled as class $x_i$; the output by an ORF is labeled with parameters $H^p$, which can be updated online. An example of $p(x_i; H^p)$ output by an ORF is shown in FIG. 2c.

In some implementations, superpixels can be used to provide mid level support for image understanding tasks. Superpixels, which are used to cluster pixels in a frame, are shown in the example in FIG. 2b. In order to exploit mid level information, clustering techniques such as SLIC (Simple Linear Iterative Clustering) algorithm can be used to cluster the pixels into superpixels. An example of superpixels generated for an image is shown in FIG. 2b. Let S denote a set of superpixels. Each superpixel $k \in S$ can be assigned a binary label $y_k \in \{0,1\}$ similar to $x_i$ at pixel level. As discussed previously, an ORF can be trained to output the probability that the superpixel belongs to the foreground or background, using the features extracted from each superpixel (e.g., FIG. 2e). Similarly, a superpixel level energy function can be defined as:

$$\varphi_k^s(y_k) = -\log p(y_k; H^s) \quad \text{(Equation 2)}$$

where the symbols are analogous to those in Equation 1.

At a high level such as a frame level, a bounding box can be used to delimit the object of interest. Let B(z) denote the bounding box with pose parameters z. Let energy function $\phi(B(z))$ encode the occurrence likelihood of the target in bounding box B(z). Function $\phi(B(z))$ can be unified with information from other representation (or quantization) levels. The choice of function $\phi(B(z))$ is modular and can vary from simple matching techniques to sophisticated classification models.

In some implementations, Median Flow Tracker (MFT) can be used to provide the bounding box level representation. MFT uses feature matching to estimate the motion of the target. Moreover, it measures the discrepancies of the forward and backward tracking in consecutive frames and reports failure when the target is lost. If failure is detected, a tracking result $z^M$ can be assigned a value of 0. The bounding box energy function $\phi(B(z))$ can be defined as:

$$\varphi(B(z)) = \begin{cases} 0, & z^M = 0 \\ D^2(B(z), B(z^M)), & \text{otherwise} \end{cases} \quad \text{(Equation 3)}$$

$D(B(z), B(z^M))$ is the distance between the centers of two bounding boxes $B(z)$ and $B(z^M)$ in the image frame.

Given the above three levels, a CRF model can be used to fuse the information from different levels. Each unit at different levels can be represented by a node in the graph, and the corresponding unary potential functions can be used to encode or represent the terms in Equations 1-3. For example, the units can include nodes at the pixel level, the superpixel level, the bounding box level, or at any other representation level. The interactions between these nodes can then be captured by connecting them using the CRF's edges with appropriate potential functions, also referred to herein as interaction functions or pairwise potentials.

The connection between pixel nodes can be implemented as associating an edge between a pair of neighboring pixels (or pixel nodes). All such edges between neighboring pixels can be denoted as $\mathcal{E}^{pp}$. The following function can be used to encode or represent the interaction between the labeling of the pixels:

$$\psi_{i,j}(x_i, x_j) = \begin{cases} \exp\left(-\dfrac{\|f_i - f_j\|^2}{\sigma^2}\right), & \text{if } x_i \neq x_j \\ 0, & \text{otherwise} \end{cases} \quad \text{(Equation 4)}$$

where $\|f_i - f_j\|$ is the distance between $x_i$ and $x_j$ in the feature space, and $\sigma$ is a parameter controlling the shape of the monotonically decreasing function. In some implementations, a 4-neighborhood system is used. However, a different neighborhood system, such as an 8-neighborhood system or another user-defined neighborhood system can also be used.

Pixels in the same superpixel tend to share the same superpixel label. The connection between a pixel node and a superpixel node can be implemented as associating an edge between a pixel node and a superpixel node. All such edges can be denoted as $\mathcal{E}^{sp}$. Therefore, for each pixel $i$ in superpixel $k$, an edge can be associated with its potential function using the Potts model:

$$\xi_{i,k}(x_i, y_k) = \begin{cases} 1, & \text{if } x_i \neq y_k \\ 0, & \text{otherwise} \end{cases} \quad \text{(Equation 5)}$$

Equation 5 can be used to penalize the inconsistency in labeling between superpixels and pixels.

The pixel nodes can also be connected with the bounding box node. The pairwise potential function $w_i(z,x_i)$ can be used to encourage consistency between pixel labeling and the pose of the bounding box:

$$w_i(z, x_i) = \begin{cases} d(z, i), & \text{if } (x_i = 1, i \in \mathcal{P}_{B(z)}^{Out}) \text{ or } (x_i = 0, i \in \mathcal{P}_{B(z)}^{In}) \\ 0, & \text{otherwise} \end{cases} \quad \text{(Equation 6)}$$

where $d(z,i)$ represents the minimum normalized distance between the pixel $i$ to the boundary of the bounding box $B(z)$; $\mathcal{P}_{B(z)}^{In}$ and $\mathcal{P}_{B(z)}^{Out}$ denote the set of pixels inside and outside of the bounding boxes, respectively.

The minimum normalized distance takes into consideration the size of the bounding box. The pixels inside the bounding box tend to belong to the object, while the pixels outside the bounding box tend to belong to the background. The closer a pixel is to the boundary of the bounding box, the more ambiguous or uncertain the pixel label can be. Accordingly, the pixel can be penalized for having a different label than expected by using a cost proportional to the distance between the pixel and the boundary of the bounding box.

Given an image I, the joint probability of the realization $(z,x,y)=(z,x=(x_i)_{i\in\mathcal{P}},y=(y_k)_{k\in\mathcal{S}})$ of all random variables in the CRF model can be formulated as a Gibbs distribution $P(z,x,y|I)=e^{-E(z,x,y)}$. The corresponding Gibbs energy function $E(z,x,y)$ can be defined as the sum of the unary functions and pairwise functions (i.e., unary potentials and pairwise potentials) described above:

$$E(z,x,y) = \mu\phi(B(z)) + \Sigma_{i\in\mathcal{P}}\,\theta_i^p(x_i) + \alpha\Sigma_{k\in\mathcal{S}}\theta_k^s(y_k) + \lambda\Sigma_{i\in\mathcal{P}}w_i(x_i,z) + \beta\Sigma_{\{i,k\}\in\mathcal{E}_{sp}}\xi_{i,k}(x_i,y_k) + \gamma\Sigma_{\{i,j\}\in\mathcal{E}_{pp}}\psi_{i,j}(x_i,x_j) \quad \text{(Equation 7)}$$

where $\mu, \alpha, \lambda, \beta, \gamma$ are the weight coefficients which balance the importance of each potential term. As previously discussed, $\phi(B(z))$ is the unary function for the bounding box. $\Sigma_{i\in\mathcal{P}}\,\theta_i^p(x_i)$ is the sum of pixel level energy function. $\Sigma_{k\in\mathcal{S}}\theta_k^s(y_k)$ is the sum of superpixel level energy function. $\Sigma_{i\in\mathcal{P}}w_i(x_i,z)$ is the sum of pairwise potentials between pixel nodes and bounding box node. $\Sigma_{\{i,k\}\in\mathcal{E}_{sp}}\xi_{i,k}(x_i,y_k)$ is the sum of pairwise potentials between pixel nodes and superpixel nodes. $\Sigma_{\{i,j\}\in\mathcal{E}_{pp}}\psi_{i,j}(x_i,x_j)$ is the sum of pairwise potentials between pixel nodes.

For tracking, the optimal pose parameters $z$ for the bounding box can be determined. The minimization of $E(z,x,y)$ with respect to $x$ and $y$ can be efficiently solved for each possible $z$ using existing techniques, such as graph cuts techniques. An auxiliary function $\hat{E}(z)$ can be defined accordingly, and the optimal $z^*$ can be searched for $\hat{E}(z)$ using an existing optimization algorithm, such as any off-the-shelf optimization algorithms. For example, $z^*$ can be solved by:

$$z^* = \underset{z}{\operatorname{argmin}}\left\{\hat{E}(z) = \min_{x\in\{0,1\}^{|\mathcal{P}|}, y\in\{0,1\}^{|\mathcal{S}|}} E(z, x, y)\right\} \quad \text{(Equation 8)}$$

In some implementations, the local dense sampling search can be used for optimization search. In some implementations, the Nelder-Mead Simplex method can be used for a more direct search. Note that during the search of $z$ in Equation 8, the update of $z$ only causes a small change in $w_i$. This can be attributed to that $\mu\phi(B(z))$ would change but would not affect the optimal $E(z,x,y)$ with respect to $x$ and $y$. Although not required, one would be motivated to use dynamic MRF algorithms (e.g., dynamic graph cuts) to obtain the value of $\hat{E}(z)$ to significantly accelerate the optimization. Other optimization algorithms can also be used.

FIG. 3 is a block diagram of an object tracking system 300 in which aspects of the disclosure, such as tracker 230, can be implemented. The object tracking system 300 can include, for example, an apparatus such as a computing device. The computing device can be any type of wearable, handheld, or other form of single computing device, or can include multiple computing devices. The computing device can have an internal configuration of hardware including a processor and a memory 304. The processor can include a processing unit such as a conventional central processing unit (CPU) 302 or any other type of device, or multiple devices, capable of manipulating or processing information. The memory 304 can be a random access memory device (RAM) or any other suitable type of storage device. The memory 304 can include data 306 that is accessed by the CPU 302 using a bus 308. The memory 304 can also include an operating system 310 and installed applications 312, the installed applications 312 including programs that permit the CPU 302 to implement the instructions to generate control signals for performing object tracking in video data related to a vehicle, such as to track an object in a video taken by a camera on a vehicle. The instructions can also include performing object tracking that is not related to a vehicle, such as to track a human object in a surveillance video. The object tracking system 300 can also include secondary, additional or external storage 314, for example, a memory card, flash drive, or any other form of computer readable medium. In one implementation, the installed applications 312 can be stored in a whole or in part in the external storage 314 and loaded into the memory 304 as needed for processing.

The object tracking system 300 can include one or more output devices, such as a display 316 and one or more input 318 devices, such as a keypad, a touch sensitive device, a sensor, or a gesture sensitive input device that can receive user inputs. Display 316 can be implemented in various ways, such as a liquid crystal display (LCD), a cathode-ray tube (CRT), or a light emitting diode (LED) display. Display 316 is coupled to CPU 302 and can be configured to display a rendering of the video data.

The object tracking system 300 can be in communication with a vehicle or another device via a wired connection, a communication device such as a transponder/transceiver device or a Wi-Fi, infrared, Bluetooth device, or a network. For example, the network can include a local area network (LAN), wide area network (WAN), virtual private network (VPN), the Internet or a cellular network. The object tracking system 300 can communicate with a control subsystem of the vehicle. The object tracking system 300 can be coupled to one or more vehicle devices configured to receive video data from the vehicle. The object tracking system 300 can also include a sensor to take sensed information from the user such as voice commands, ultrasound, gesture or other inputs from a user.

The object tracking system 300 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of object tracking system 300 do not necessarily have to be implemented in the same manner.

In one implementation, the object tracking system 300 can be implemented using general purpose computers/processors with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

FIG. 4 is a flow diagram of an example process 400 performed by the object tracking system 300 of FIG. 3. Process 400 can be implemented as a software program executed by the object tracking system 300. The software program can include machine-readable instructions that may be stored in a memory such as memory 304, and that, when executed by a processor, such as CPU 302, may cause the object tracking system 300 to perform process 400. Process 400 can also be implemented using specialized hardware or firmware. Some computing devices can have multiple memories, multiple processors, or both. The steps of process 400 can be distributed using different processors, memories, or both. Use of the terms "processor" or "memory" in the singular encompasses computing devices that have one processor or one memory as well as devices that have multiple processors or multiple memories that can each be used in the performance of some or all of the recited steps.

At a step 402, a first tracking position in a first frame of the video sequence can be received. The first tracking position can include, for example, a bounding box containing an object in the first frame. For example, the first tracking position can be the initial bounding box 208 in frame 202 of the video sequence 200. Received, as used herein, can include any manner of receiving, obtaining, reading, generating, or acquiring. The video sequence (such as the first and subsequent frames of video data and the first tracking position) can be received by the object tracking system 300, such as by the computing device executing the tracker 230. The video data or stream can be received in any number of ways, such as by receiving the video data over a network, over a cable, or by reading the video data from a primary memory or other storage device, including a disk drive or removable media, or any other device capable of communicating video data, such as a video camera connected to the computing device. The first frame can be any frame in the video sequence for performing object tracking. For example, the first frame can be frame 202 in FIG. 2. Alternatively, the first frame can be any other frame in the video sequence 200.

At a step 404, multiple representation levels and nodes for each representation level can be identified for a second frame of the video sequence. The second frame can include any subsequent frame after the first frame. For example, frame 206 in FIG. 2. The multiple representation levels can include various representation levels, quantization levels, hierarchies or granularities of element units used for object tracking in the second frame. For example, the representation levels can include pixel level 130, superpixel level 120, and bounding box level 110 as discussed in FIG. 1. The nodes associated with each representation level can be determined using, for example, the techniques described above in FIGS. 1 and 2.

At a step 406, a second tracking position in the second frame can be estimated. The second tracking position can be determined by estimating motion of the target object between the second frame and the first frame based on the first tracking position. The second tracking position can be estimated using, for example, techniques described in connection with Equation 3, such as MFT. The estimated tracking position can include, for example, a bounding box, such as the dotted lined candidate bounding boxes 170 in FIG. 1.

At a step 408, node values at each representation level are determined based on a conditional property of the nodes. In some implementations, the node values can also be determined based on a conditional property of the estimated second tracking position. For example, energy functions in Equation 1-3 can be used to determine the values of the nodes depending on the representation (e.g., pixel, superpixel, or bounding box) levels. The conditional property can be a probability value of node labeling (such as $x_i$ or $y_i$ in the equations) or pose (such as z in the equations). The value for each node can be determined as an energy potential value for the corresponding representation level in a CRF model, as discussed above.

At a step 410, the second tracking position can be adjusted based on the node values and interactions between at least some nodes at different representation levels. For example, the interactions between at least some nodes at different representation levels can be determined as pairwise potential values using Equations 4-6.

As discussed previously, Equation 7 can be used to unify the values of the nodes and the interaction functions for the second frame, which can be used to adjust the second tracking position. For example, all random variables in the CRF model can be formulated as a Gibbs distribution and the corresponding Gibbs energy function E(z,x,y) can be defined as the sum of the unary functions and pairwise functions (i.e., unary potentials and pairwise potentials) described in Equation 7. The functions can include, for example, the unary function for the bounding box, the sum of pixel level energy function, the sum of superpixel level energy function, the sum of pairwise potentials between pixel nodes and bounding box node, the sum of pairwise potentials between pixel nodes and superpixel nodes, and the sum of pairwise potentials between pixel nodes.

In some implementations, the adjusted second tracking position can be an optimization of the second tracking position based on the values and the interaction functions. Equation 8 can be used for this optimization. For example, optimization techniques, such as Nelder-Mead Simplex Method, can be used. The adjusted second tracking position can be an optimization of the second tracking position based on an energy optimization function applied to the values of the nodes and the at least one function based on interactions between the nodes at different representation levels.

In some implementations, a positive sample set and a negative sample set can be determined for training based on the first frame and the first tracking position. Further, a set of pixel level random fields and a set of superpixel level random fields can be determined based on training results from the positive sample set and the negative sample set. For example, techniques discussed in connection with Equations 9-12 below can be used for such purposes. In addition, a set of superpixels can be determined by grouping pixels in the second frame based on the set of superpixel level random fields.

In some implementations, it can be determined whether an occlusion exists within the adjusted second tracking position. In cases where no occlusion exists, the positive sample set and the negative sample set can be updated.

In some implementations, more sophisticated high level information, such as the scale change of the target, can be used to improve the tracker performance. For example, the scale change can be used to replace or in conjunction with the bounding box information at the bounding box level. The values and corresponding interaction functions can be adjusted accordingly.

In some implementations, model training techniques such as a Grabcut technique discussed below can be used to determine the pixels corresponding to the objects, which can be used as positive samples for training the RF for pixels. For example, a threshold percentage or voting scheme can be used on the pixel or superpixel level model updates.

Online Color-Texture Forests. Selection of features and an appropriate online learning process can be important factors for tracker performance. For example, online color-texture forests can used to obtain the pixel and superpixel level potentials in Equations 1 and 2.

In some implementations, texture is used as a complementary feature along with color for tracking to better represent object appearance.

As previously discussed, RFs can be used in various computer vision tasks including object recognition and image classification. The ORFs can be adapted to incorporate the high-dimensional color-texture feature for online tracking. The resulting online color-texture forest can provide very good classification results for the potential functions.

Model training. To train the two RFs for pixels and superpixels, a key issue is how to get positive and negative samples for training. In some implementations, in the first frame, given the target bounding box, a Grabcut technique can be used to automatically determine the pixels corresponding to the objects, which can be used as positive samples for training the RF for pixels. Generally, this can improve the accuracy over the case of treating all pixels inside the bounding box as foreground, since an object may not occupy the whole bounding box due to its shape.

In cases where that an object is not well segmented by Grabcut, the percentage of pixels with foreground labels in the bounding box can be checked. If the percentage is greater than a threshold, e.g., 70%, the result of Grabcut is accepted. Otherwise the result is rejected and all of the pixels inside the bounding box are used as the positive samples. For superpixels, they can be labeled using a voting scheme, e.g., the label of the superpixel can be decided by the majority of the pixels inside the superpixel.

During tracking, the ORFs can be progressively updated to handle the appearance changes. Since pixels and superpixels are labeled in the Equations such as Equation 7 by jointly exploiting the information from multiple levels during the tracking, the pixels and superpixels can be treated as candidate positive samples if they are inside the target bounding box $B(z^*)$ and labeled as positive by the tracker using Equation 8. In some implementations, these pixels and superpixels are treated as candidate positive samples only if they are inside the target bounding box and labeled positive. The pixels and superpixels outside the bounding box can be treated as candidate negative samples. Moreover, in some implementations, only the candidate samples not classified with a high confidence or incorrectly classified by their respective RFs are assigned to RFs for updates.

More specifically, the final positive sample set ($X_p^+$) and negative sample set ($X_p^-$) used for the pixel level RF update can be respectively determined as:

$$X_p^+ = \{i | x_i=1, p(x_i=1; H^p) < \varepsilon_p^+, i \in \mathbf{P}_{B(z^*)}^{In}\} \quad \text{(Equation 9)}$$

$$X_p^- = \{i | p(x_i=1; H^p) > \varepsilon_p^-, i \in \mathbf{P}_{B(z^*)}^{Out}\} \quad \text{(Equation 10)}$$

where $\varepsilon_p^+$, $\varepsilon_p^-$ (and $\varepsilon_{sp}^+$, $\varepsilon_{sp}^-$ below) are the predefined thresholds.

For the superpixel level RF update, the positive sample set ($X_{sp}^+$) and negative sample set ($X_{sp}^-$) can be similarly determined as:

$$X_{sp}^+ = \{k | y_k=1, p(y_k=1; H^s) < \varepsilon_{sp}^+, k \in S_{B(z^*)}^{In}\} \quad \text{(Equation 11)}$$

$$X_{sp}^- = \{k | p(y_k=1; H^s) > \varepsilon_{sp}^-, k \in S_{B(z^*)}^{Out}\} \quad \text{(Equation 12)}$$

where $S_{B(z^*)}^{in}$ and $S_{B(z^*)}^{Out}$ denote the set of superpixels inside and outside the bounding box $B(z^*)$, respectively. Note that in Equations 11 and 12, the voting scheme previously presented can still be used to determine whether a superpixel is inside or outside the bounding box.

Occlusion. In some implementations, occlusions are also taken into account during updates, especially when the target is temporarily out of view. The pixel labeling can be used to handle occlusions. For example, a flag of occlusion can be triggered if the percentage of foreground pixels inside the bounding box is less than a predefined threshold θ. In this case, the RFs are kept unchanged without any update.

As an example, an algorithm for object tracking is described in Algorithm 1. Other algorithms can also be used.

---
Algorithm 1 Tracking with Multilevel Representations
---

Input: The target bounding box $B(z_1^*)$ in the first frame; T frames to track.
Output: Estimated target position B $(z_t^*)$, where t = 2, 3 ..., T is the frame index.
1:  /*Initialization*/
2:  Apply Grabcut to find the positive and negative samples.
3:  Train pixel- and superpixel-level RFs using the collected samples.
4:  /*Start to track*/
5:  for t = 2 to T do
6:      /*Pixel level*/
7:      Extract features for each pixel i and obtain the pixel-level measurement $p(x_i; H^p)$.
8:      /*Superpixel level*/
9:      Apply SLIC to generate superpixels.
10:     Extract features for each superpixel k and obtain the superpixel-level measurement $p(y_k; H^s)$.
11:     /*Bounding box level and combine multilevel representations*/
12:     Estimate the motion of target using MFT and obtain B $(z_t^M)$.
13:     Find the target $B(z_t^*)$ by solving Equation 8 using Nelder-mead simplex method with dynamic graph cuts.
14:     if not occluded then
15:         Update $H^p$ of the pixel-level RF using $X_p^+, X_p^-$.
16:         Update $H^s$ of the superpixel-level RF using $X_{sp}^+, X_{sp}^-$.
17:     end if
18: end for

---

In some implementations, a bounding box with a fixed size during the tracking is used. In order to track objects with different resolutions using the same parameters, the image can be resized. In one non-limiting example, the short side of the target bounding box in the first frame can be set to have a length of 35 pixels. After tracking, the results of MQT can be projected back to the original image for fair comparison. The minimum normalized distance $d(z,i)$ in Equation 6 can be computed by, for example, measuring minimum distance between pixel i and the bounding of bounding box B(z) in a resized coordinate system.

Process 400 is depicted and described as a series of steps. However, steps in accordance with this disclosure can occur in various orders or concurrently. Additionally, steps in accordance with this disclosure may occur with other steps not presented and described herein. Furthermore, not all illustrated steps may be required to implement a method of object tracking using multilevel representations.

Further, all or a portion of embodiments can take the form of a computer program product accessible from, for example, a non-transitory computer-usable or computer-readable medium. A non-transitory computer-usable or computer-readable medium can be any device that can, for example, tangibly contain, store, communicate, or transport the program for use by or in connection with any processor. The non-transitory medium can be, for example, an electronic device, magnetic device, optical device, electromagnetic device, or a semiconductor device. Other suitable mediums are also available.

While this disclosure includes what is presently considered to be the most practical and preferred embodiments, it is to be understood that the disclosure is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of tracking a target object in frames of video data, comprising:
   receiving a first tracking position associated with the target object in a first frame of a video sequence;
   identifying, for a second frame of the video sequence, a plurality of representation levels, wherein the plurality of representation levels includes a bounding box level;
   determining, by a processor, at least one node for each representation level, wherein the at least one node for the bounding box level is included in a second tracking position associated with the target object in the second frame determined by estimating motion of the target object between the first frame and the second frame;
   determining, at each of the plurality of representation levels by the processor, a value for each node based on a conditional property of the node; and
   adjusting, by the processor, the second tracking position based on the values determined for each of the nodes and interactions between at least the at least one node for the bounding box level and the at least one node for a different representation level.

2. The method of claim 1, wherein the plurality of representation levels is hierarchical.

3. The method of claim 1, wherein the plurality of representation levels comprises a pixel level, a superpixel level, and the bounding box level.

4. The method of claim 1, wherein the first and second tracking positions each include a bounding box, with the bounding box included in the second tracking position being associated with the at least one node for the bounding box level.

5. The method of claim 1, wherein the conditional property is a probability of a node label.

6. The method of claim 1, wherein, at the bounding box level, the conditional property is a probability of a node pose.

7. The method of claim 1, wherein the value for each node is determined as an energy potential value for the corresponding representation level in a Conditional Random Field model.

8. The method of claim 1, wherein the interactions between the at least one node for the bounding box level and the at least one node for a different representation level are determined based on pairwise energy potential values therebetween in a Conditional Random Field model.

9. The method of claim 1, wherein the plurality of representation levels comprises a pixel level, a superpixel level, and the bounding box level, and wherein the at least one node for each representation level is associated with one of a pixel, a superpixel, or a bounding box based on the corresponding representation level.

10. The method of claim 9, further comprising:
    determining, for training, a positive sample set and a negative sample set based on the first frame and the first tracking position;

determining a set of pixel level random fields and a set of superpixel level random fields based on training results from the positive sample set and the negative sample set; and determining a set of superpixels by grouping pixels in the second frame based on the set of superpixel level random fields.

11. The method of claim 10, further comprising:

determining if an occlusion exists within the adjusted second tracking position; and updating the positive sample set and the negative sample set based on the determination that no occlusion exists within the adjusted second tracking position.

12. An apparatus for tracking a target object in frames of video data, comprising:

one or more processors; and a memory for storing data and program instructions executed by the one or more processors, wherein the one or more processors are configured to executed instructions stored in the memory to:

receive a first tracking position associated with the target object in a first frame of a video sequence;

identify, for a second frame of the video sequence, a plurality of representation levels, wherein the plurality of representation levels includes a bounding box level;

determine at least one node for each representation level, wherein the at least one node for the bounding box level is included in a second tracking position associated with the target object in the second frame determined by estimating motion of the target object between the first frame and the second frame;

determine, at each of the plurality of representation levels, a value for each node based on a conditional property of the node; and adjust the second tracking position based on the values determined for each of the nodes and interactions between at least the at least one node for the bounding box level and the at least one node for a different representation level.

13. The apparatus of claim 12, wherein the plurality of representation levels is hierarchical.

14. The apparatus of claim 12, wherein the plurality of representation levels comprises a pixel level, a superpixel level, and the bounding box level.

15. The apparatus of claim 12, wherein the first and second tracking positions each include a bounding box, with the bounding box included in the second tracking position being associated with the at least one node for the bounding box level.

16. The apparatus of claim 12, wherein, at the bounding box level, the conditional property is a probability of a node pose.

17. The apparatus of claim 12, wherein the value for each node is determined as an energy potential value for the corresponding representation level in a Conditional Random Field model.

18. The apparatus of claim 12, wherein the interactions between the at least one node for the bounding box level and the at least one node for a different representation level are determined based on pairwise energy potential values therebetween in a Conditional Random Field model.

19. The apparatus of claim 12, wherein the second tracking position is adjusted based on interactions between at least some of the nodes at the same representation level.

20. The apparatus of claim 12, wherein the instructions further comprise instructions stored in the memory to:

determine, for training, a positive sample set and a negative sample set based on the first frame and the first tracking position;

determine a set of pixel level random fields and a set of superpixel level random fields based on training results from the positive sample set and the negative sample set; and determine a set of superpixels by grouping pixels in the second frame based on the set of superpixel level random fields.

* * * * *

UNITED STATES PATENT AND TRADEMARK OFFICE
CERTIFICATE OF CORRECTION

| | | |
|---|---|---|
| PATENT NO. | : 9,519,837 B2 | Page 1 of 1 |
| APPLICATION NO. | : 14/323360 | |
| DATED | : December 13, 2016 | |
| INVENTOR(S) | : Xue Mei et al. | |

It is certified that error appears in the above-identified patent and that said Letters Patent is hereby corrected as shown below:

Column 6, Line 56: replace $\phi(B(z))$ with -- $\varphi(B(z))$ --
Column 6, Line 57: replace $\phi(B(z))$ with -- $\varphi(B(z))$ --
Column 6, Line 59: replace $\phi(B(z))$ with -- $\varphi(B(z))$ --
Column 7, Line 2: replace $\phi(B(z))$ with -- $\varphi(B(z))$ --
Column 8, Line 16: replace $(z,x,y)=(z,x=(x_i)_{i\in P}, y=(y_k)_{k\in S})$ with -- $(z, \mathbf{x}, \mathbf{y}) = (z, \mathbf{x} = (x_i)_{i\in P}, \mathbf{y} = (y_k)_{k\in S})$ --

Column 8, Line 22: replace
$$E(z,x,y)=\mu\phi(B(z))+\Sigma_{i\in P}\phi_i^P(x_i)+\alpha\Sigma_{k\in S}\phi_k^S(y_k)+\lambda\Sigma_{i\in P}w_i(x_i,z)+\beta\Sigma_{\{i,k\}\in\varepsilon}\xi_{i,k}(x_i,y_k)+\gamma\tau_{\{i,j\}\in\varepsilon^{PP}}\psi_{i,j}(x_i,x_j)$$
with
$$E(z, \mathbf{x}, \mathbf{y}) = \mu\phi(\mathbf{B}(z)) + \Sigma_{i\in P}\phi_i^P(x_i) + \alpha\Sigma_{k\in S}\phi_k^S(y_k) + \lambda\Sigma_{i\in P}w_i(x_i,z) + \beta\Sigma_{\{i,k\}\in\varepsilon^{SP}}\xi_{i,k}(x_i,y_k) + \gamma\Sigma_{\{i,j\}\in\varepsilon^{PP}}\psi_{i,j}(x_i,x_j)$$

Column 8, Line 28: replace $\phi(B(z))$ with -- $\varphi(B(z))$ --

Column 8, Line 29: replace $\Sigma_{i\in P}\phi_i^P(x_i)$ with -- $\Sigma_{i\in P}\phi_i^P(x_i)$ --

Column 8, Lines 30-31: replace $\Sigma_{i\in P}w_i(x_i,z)$ with -- $\Sigma_{i\in P}w_i(x_i,z)$ --

Column 8, Line 32: replace $\Sigma_{i,k\in\varepsilon}\xi_{i,k}(x_i,y_k)$ with -- $\Sigma_{\{i,k\}\in\varepsilon^{SP}}\xi_{i,k}(x_i,y_k)$ --

Column 8, Line 34: replace $\Sigma_{\{i,j\}\in\varepsilon^{PP}}\psi_{i,j}(x_i,x_j)$ with -- $\Sigma_{\{i,j\}\in\varepsilon^{PP}}\psi_{i,j}(x_i,x_j)$ --

Column 8, Line 55: replace $\phi(B(z))$ with -- $\varphi(B(z))$ --

Signed and Sealed this
Ninth Day of January, 2018

Joseph Matal
*Performing the Functions and Duties of the
Under Secretary of Commerce for Intellectual Property and
Director of the United States Patent and Trademark Office*